INVENTORS
JAMES R. BROWN, JR.
JOHN D. WALLACE

BY

ATTORNEYS

Dec. 29, 1959     J. R. BROWN, JR., ET AL     2,919,399
                 AUTOMATIC IMPEDANCE PLOTTER

Filed Jan. 5, 1955                           3 Sheets-Sheet 3

INVENTORS
JAMES R. BROWN, JR.
JOHN D. WALLACE
BY
ATTORNEYS

United States Patent Office 2,919,399
Patented Dec. 29, 1959

2,919,399

AUTOMATIC IMPEDANCE PLOTTER

James R. Brown, Jr., Hatboro, and John D. Wallace, Oreland, Pa.

Application January 5, 1955, Serial No. 480,077

6 Claims. (Cl. 324—57)

(Granted under Title 35, U.S. Code (1952), sec. 266)

The invention described herein may be manufactured and used by or for the Government of the United States of America for governmental purposes without the payment of any royalties thereon or therefor.

This invention relates to a method and apparatus for automatically calculating the series components of a complex electrical input in terms of a third parameter.

In the design of electronic equipment it is essential to have available rapid and accurate means for calculating the impedance characteristics of component networks, such as, loud speakers, transducers, transformers, filters and others. Impedance characteristics of a network are conveniently presented by a plot on which the values $\pm jx$ and $r$ are plotted as ordinate and abscissa, respectively, in terms of a third parameter such as frequency. In constructing this plot, in the past, it was necessary to take measurements on an impedance bridge for individual values of the parameter, followed by calculations of the values $\pm jx$ and $r$ and plotting the values by hand for each point on the curve. This method requires an extended time for a single plot. Further, it is susceptible to errors in indicated data due to unwanted changes in parameters during the run, and to errors in calculations made from the indicated data. Also, the curve produced is not a true plot due to the practical impossibility of obtaining values for all points on the curve and reducing them to a plot. In fact, the calculations and plotting of enough points to furnish a satisfactorily representative plot requires a prohibitive amount of time.

It is, therefore, an object of this invention to provide a method and apparatus for automatically calculating the series components of a complex electrical input in terms of a third parameter.

It is another object of this invention to provide apparatus operative to accept a complex electrical input varying with a given parameter, resolve the input into its real and imaginary components and automatically produce a plot of the components in terms of the parameter.

It is still another object of this invention to provide apparatus for automatically and rapidly plotting the complex series impedance of a network as a function of frequency, which is highly accurate and gives coverage of all points on the plotted curve.

It has been found that the above and other objects are accomplished by a method which comprises reducing the magnitude and phase angle of the complex vector of a complex electrical input at a given frequency to representative electrical outputs, rectifying the outputs, converting the phase angle output to its sine and cosine values and multiplying electronically the cosine and sine values by the output representing the rectified magnitude of the complex vector to produce the numerical values of the real and imaginary components, respectively, of the complex variable for the given parameter, and automatically plotting the values.

The invention is most readily understood by reference to the following description and the accompanying drawings hereby made a part of this application, and in which Fig. 1 is a block diagram of the automatic calculating and plotting apparatus of the invention;

The invention is illustrated by an application in which the complex electrical input is the impedance of a complex network.

Figure 1:
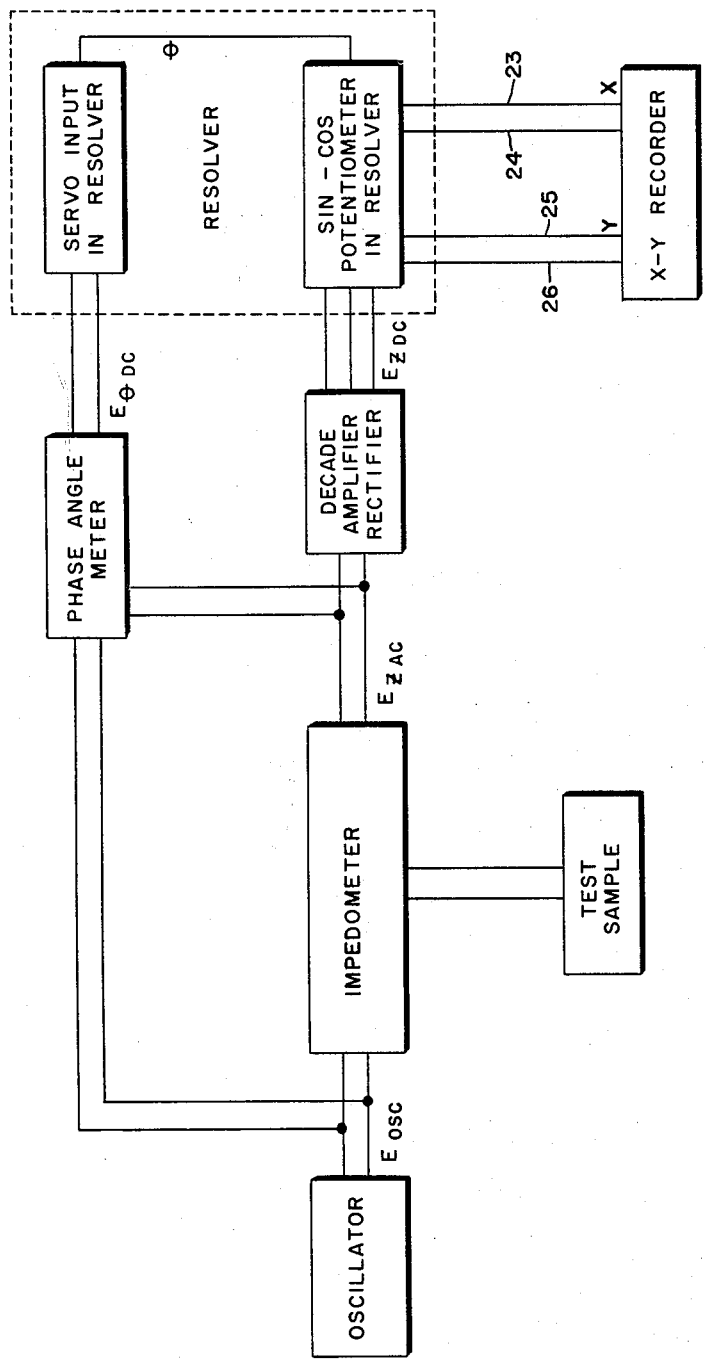

Referring to Fig. 1, an oscillator is provided to vary the input frequency over the desired range which input is fed into an impedometer which comprises a resistive network and calibrating resistors. The impedometer is of the standard type and is provided with conventional switching means for replacing the calibrating resistor in the circuit with the sample after calibration of the network and provides for the maintenance of a constant current through the sample, by the insertion in series with the sample, of a resistor having an impedance which is substantially of the character $r+j0$ and about one hundred times that of the sample. The variation of the voltage drop across the sample, therefore, is proportional to the impedance of the sample as the frequency parameter is varied. With the test sample in place in the resistive network, the voltage ($E_{Z_{AC}}$) is fed into a decade amplifier-rectifier. The voltage $E_{Z_{AC}}$ is amplified as required and rectified and the output $E_{Z_{DC}}$ obtained as positive and negative D.C. voltages as shown in Fig. 2.

Figure 2:
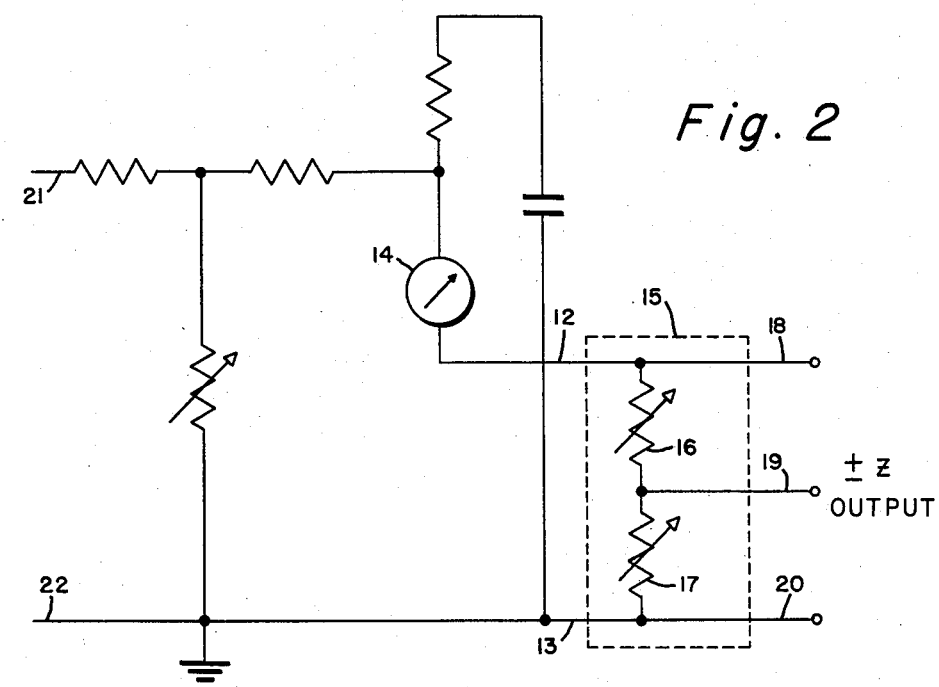
Fig. 2 is a partial circuit diagram of a conventional decade amplifier-rectifier modified as shown by the dotted lines to produce positive and negative D.C. output.

Fig. 2 shows a small portion of the conventional construction of the decade amplifier-rectifier in detail with the modification included therein for the proper operation of the plotter. Leads 12 and 13 represent the output connections of the decade amplifier-rectifier including the D.C. current meter 14. Within the phantom line 15 is shown a pair of variable resistors 16 and 17 and three output connections 18, 19 and 20. The arrangement within the phantom line 15 has been added so as to permit the use of positive, zero, and negative outputs which are required in the sine-cosine potentiometer. Leads 21 and 22 are connected to the remainder of the circuitry of the decade amplifier-rectifier (not shown).

Referring again to Fig. 1, the voltage $E_{OSC}$ of the oscillator is placed across one set of terminals of a phase angle meter. The voltage $E_{Z_{AC}}$ from the output of the impedometer is placed across the other set of input terminals of the phase angle meter. The phase angle between the oscillator voltage and the voltage across the sample is the phase angle of the unknown impedance. This phase angle is measured by the phase angle meter which gives a direct current output voltage, $E_{\theta_{DC}}$, corresponding in polarity to the character of the unknown impedance, i.e., leading or lagging the oscillator voltage and of a magnitude proportional to the magnitude of the phase angle.

Figure 3:
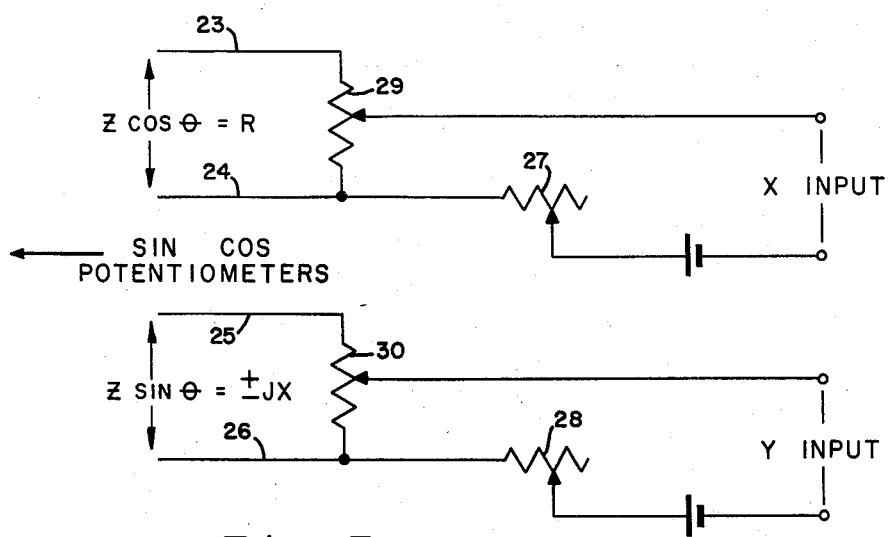
Fig. 3 is a circuit showing the method used for biasing a conventional recorder to handle the $r$ and $jx$ outputs of the resolver.

The arrangement described so far produces a D.C. voltage output of the phase angle meter which corresponds in sense and magnitude to the phase angle and a D.C. voltage output of the decade amplifier-rectifier which is proportional to the total impedance of the sample. The desired components of the impedance triangle are $Z \sin \theta$ and $Z \cos \theta$ when $Z$ is the total impedance and $\theta$ is the phase angle of the unknown impedance. The trigonometric operation is carried out in the resolver which consists of a servo system for $\theta$ and a sine-cosine potentiometer for the actual calculation. The arms of the potentiometer are positioned by the magnitude of the D.C. $\theta$ signal and the D.C. Z signal is impressed across the potentiometer. The output is therefore, Z sine $\theta$ and Z cosine $\theta$ to give $\pm jx$ and $r$, respectively, the series components of the complex impedance. The two varying D.C. voltages are fed into the biasing network as shown in Fig. 3 and from there to the ordinate and abscissa inputs of the X—Y recorder. This will position the pen at the coordinate point Z sine $\theta$, Z cosine $\theta$, $\pm jx$ and $r$, respectively. As the frequency of the oscillator is varied the pen will draw out the locus of the vector impedance.

Fig. 3 illustrates the details of the circuitry between the sine-cosine potentiometer and the X—Y recorder shown in Fig. 1. Lines 23 and 24 carry the resistive component of the unknown impedance into the recorder while lines 25 and 26 carry the reactive portion. A pair of rheostats 27 and 28 permit convenient orientation of the zero points on the recording sheet; while potentiometers 29 and 30 control the amplitude of the signal traced by the recorder, as is understood by one skilled in the art.

Figure 4:
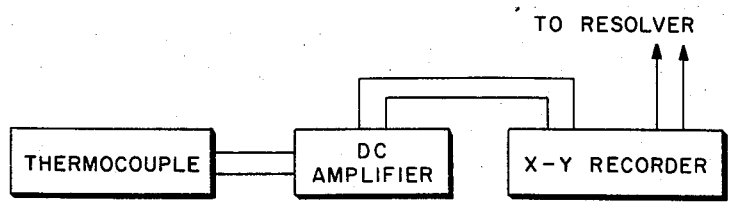
Fig. 4 is a partial block diagram showing how a third parameter is fed into the computer to give a plot of the parameter as change in capitance.

A modification of this invention provides for the plotting of dielectric constant or capacity against temperature as a third parameter. This is accomplished by replacing the cosine $\theta$ equal R component of the impedance plotter (lines 23 and 24 in Fig. 3) with a conventional thermocouple and D.C. amplifier and connecting the output to the X input of the recorder, as shown in Fig. 4. The recorder then indicates the change in $jX$ with change in temperature. In practice, a capacitor to be tested would be the unknown impedance. Since only the reactive component is to be traced, lines 23 and 24 in Fig. 3 carrying the resistive component would be unnecessary. The circuitry in Fig. 4 including a thermocouple would be substituted therefor, providing the X input to the recorder. Of course, some means, such as a conventional oil bath, for changing the temperature of the test capacitor, would be required.

An analogous modification is the substitution of a thermocouple-amplifier temperature indicator for the other component sine $\theta$ equal plus or minus $jX$ of the impedance plotter to give a change in resistance as a function of temperature.

Figure 5:
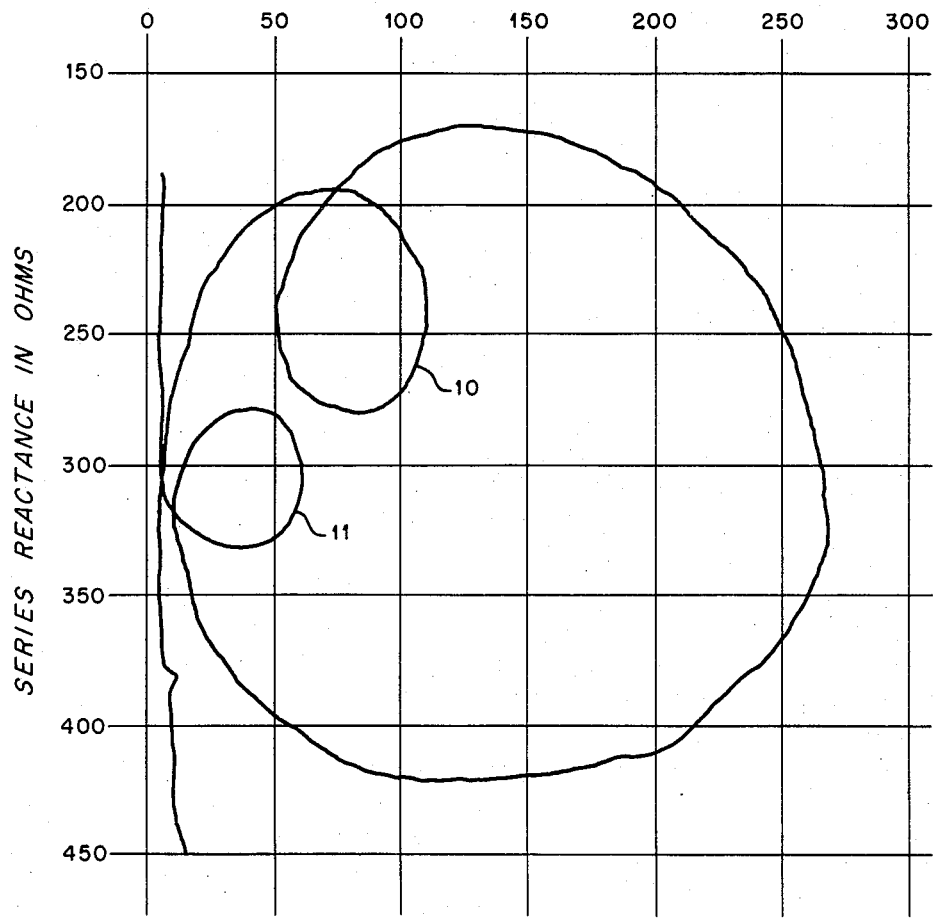
Fig. 5 is an impedance plot of a barium titanate-lead titanate element made with the device of the invention in a frequency range of 20–50 kilocycles.

The effectiveness of the apparatus of the invention is illustrated by the fact that an impedance plot within the range of 20–40 kilocycles can be made with it in from two to three minutes which reflects an infinite number of points and, therefore, gives the entire plot of a test sample. In contrast, one man day is required to make a comparable plot within the same frequency range using only fifty points. The accuracy of the device is illustrated by reference to Fig. 5, an impedance plot made with the device in the range of 20–50 kilocycles using a ferroelectric barium titanate test sample. It will be noted that the plot shows the loops 10 and 11 in minute detail. If this plot were made by hand it would be practically impossible to obtain enough points in a reasonable time to show these loops in detail and they might even be missed altogether.

It is thus seen that an impedance calculating and plotting device has been provided which is highly accurate and which plots, automatically, an infinite number of points with a highly increased saving in time. In the application of production testing, for example, the device has the advantage that, whereas, formerly only spot checks could be made because of the long testing time required with the former method, now each individual sample can be tested by application of the present invention. This results in a more effective quality control with the result that a product of higher average quality can be produced.

While the operation of the invention has been illustrated by its application in obtaining the values R and $jX$ of a complex impedance input, it is not restricted to this application as it can be used to calculate any variable of an input which can be represented by a complex electrical input. One application in which it may be successfully used is the calculation of the viscosity of various mediums by calculating the change in complex impedance of a sample of barium titanate immersed in the medium, the change in impedance being relative to the change in viscosity.

Obviously, many modifications and variations of the present invention are possible in the light of the above teachings. It is, therefore, to be understood that within the scope of the appended claims the invention may be practiced otherwise than as specifically described.

What is claimed is:

1. Apparatus for automatically obtaining the complex impedance of an electrical network comprising, in combination, oscillator means for producing an alternating current test signal at a preselected frequency, means having relatively high resistance when compared to the impedance of said network connected in series with said network for receiving said test signal and producing an adjusted alternating current signal across said network thereby substantially proportional in amplitude to the impedance of said network, means for measuring the difference in phase between said adjusted and test signals and producing a first direct current signal having a magnitude proportional to the phase difference and a polarity corresponding to the reactive component of said complex impedance, means for rectifying said adjusted alternating current signal and producing a second direct current signal having a magnitude proportionally directly to the impedance of said network, and electrical resolver means responsive to said first direct current signal indicative of said phase difference and said second direct current signal indicative of the magnitude of said impedance for resolving said signals into a pair of rectangular voltage components representing the magnitude of the series resistive and reactive components of the complex impedance of said electrical network.

2. Apparatus for automatically calculating and plotting the series resistive and reactive components of the complex impedance of an electrical network comprising, in combination, oscillator means for producing an alternating current test signal over a preselected range of frequencies, means having relatively high resistance when compared to the impedance of said network connected in series with said network for receiving said test signal and producing an adjusted alternating current signal across said network thereby substantially proportional in amplitude to the impedance of said network, means for measuring the difference in phase between said adjusted and test signals and producing a first direct current signal having a magnitude proportional to the phase difference and a polarity corresponding to the reactive component of said complex impedance, means for rectifying said adjusted alternating current signal and producing a second direct current signal, an electrical resolver means responsive to said first direct current signal indicative of said phase difference and the second direct current signal indicative of the magnitude of said complex impedance for converting said signals into a pair of rectangular voltage components representing the magnitude of the series resistive and reactive components of the complex impedance of said network, and automatic means for plotting said resistive and reactive components as a function of the frequency of said alternating current test signal.

3. Apparatus for automatically calculating and plotting the series resistive and reactive components of the complex impedance of an electrical network comprising, in combination, oscillator means for producing an alternating current test signal over a preselected range of frequencies, means having relatively high resistance when compared to the impedance of said network connected in series with said network for receiving said test signal and producing an adjusted alternating current signal across said network thereby substantially proportional in amplitude to the impedance of said network, means for measuring the difference in phase between said adjusted and test signals and producing a first direct current signal having a magnitude proportional to said phase difference and a polarity corresponding to the reactive component of said complex impedance, rectifier means for rectifying said adjusted alternating current signal and producing a second direct current signal as a function of the impedance of said network, a sine-cosine potentiometer connected to said rectifier means for receiving said second direct current signal and provided with a pair of wipers, servo means responsive to said first direct current signal for positioning said wipers to select a pair of components of said second direct current signal as a function of the resistive and reactive components of the series complex impedance of said network, and means for plotting said resistive and reactive components as a function of the frequency of said alternating current test signal.

4. Impedance measuring apparatus for determining the complex electrical impedance of a specimen, comprising in combination, an alternating current voltage source including means for selectively varying the frequency of said source, a substantially resistive element having a relatively high value of resistance compared with the impedance of said specimen connected in series with said alternating current voltage source and the specimen for substantially constant current flow, said specimen developing a complex voltage having a magnitude proportional to the complex impedance of said specimen, phase determining means electrically connected in shunt with the specimen and said alternating current source for providing a first direct current potential level having a magnitude proportional to the angular phase difference between the alternating current voltage of said source and said complex voltage and a polarity corresponding to the reactive component of said complex impedance, means connected in shunt with said specimen and responsive to the complex voltage thereof to produce a second direct current potential level proportional to the magnitude of the complex voltage of said specimen, and electrical resolver means including a sine-cosine potentiometer responsive to said first direct current potential level indicative of said angular phase difference and said second direct current potential level indicative of the magnitude of said complex impedance for converting said potential levels into a pair of rectangular voltage components representing the magnitude of the series resistive and reactive components of the complex impedance of said specimen as a function of the frequency of said alternating current voltage source.

5. The impedance measuring apparatus of claim 4 which includes a thermocouple means operably associated with said specimen to produce a potential level proportional to the temperature of said specimen, whereby the complex impedance of said specimen is obtained as a function of said temperature.

6. Impedance measuring apparatus for determining the complex electrical impedance of a specimen, comprising in combination, an alternating current voltage source including means for selectively varying the frequency of said source, a substantially resistive element having a relatively high value of resistance compared with the impedance of said specimen connected in series with said source and the specimen for substantially constant current flow, said specimen developing a complex voltage having a magnitude proportional to the complex impedance of the specimen, phase determining means having an input connected in shunt with the specimen and said alternating current voltage source for measuring the angular phase difference between the voltage of said specimen and the alternating current voltage of said source, means including a sine-cosine potentiometer responsive to the voltage of said specimen and the output of said phase determining means for resolving the complex voltage of said specimen into rectangular voltage components representing the series resistive and reactive components of the complex electrical impedance of said specimen, and recording means connected to the output of said electrical means for plotting the values of said series resistive and reactive components as a function of the frequency of said alternating current source.

References Cited in the file of this patent

UNITED STATES PATENTS

| | | |
|---|---|---|
| 2,316,434 | Irwin | Apr. 13, 1943 |
| 2,557,798 | Reitz | June 19, 1951 |
| 2,557,811 | Brown | June 19, 1951 |
| 2,594,887 | Earls | Apr. 29, 1952 |
| 2,611,005 | Wilson | Sept. 16, 1952 |
| 2,703,400 | Gray | Mar. 1, 1955 |
| 2,746,015 | Alsberg | May 15, 1956 |

OTHER REFERENCES

Gabriel: "An Automatic Impedance Record for X-Band," NRL Report 4204, page 20, August 20, 1953.

Packard: "Automatic Smith Chart Plotter," Tel-Tech and Electronic Industries, April 1953, pp. 65–67.